US007636342B2

United States Patent
Tang

(10) Patent No.: US 7,636,342 B2
(45) Date of Patent: Dec. 22, 2009

(54) WLAN DEVICE AND METHOD FOR NUMBERING FRAMES WITH SEQUENCE NUMBERS

(75) Inventor: Cheng-Wen Tang, Shenzhen (CN)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 391 days.

(21) Appl. No.: 11/308,051

(22) Filed: Mar. 4, 2006

(65) Prior Publication Data

US 2007/0189245 A1  Aug. 16, 2007

(30) Foreign Application Priority Data

Aug. 19, 2005  (CN)  .................. 2005 1 0036750

(51) Int. Cl.
*H04W 4/00* (2009.01)
*H04J 3/24* (2006.01)
*H04L 12/28* (2006.01)

(52) U.S. Cl. .................. 370/338; 370/349; 370/394

(58) Field of Classification Search ...... 370/389–395.1, 370/338, 349; 709/223–224
See application file for complete search history.

(56) References Cited

U.S. PATENT DOCUMENTS

| 6,236,654 | B1 * | 5/2001 | Egbert ..................... 370/392 |
| 6,640,248 | B1 * | 10/2003 | Jorgensen ................. 709/226 |
| 6,836,862 | B1 | 12/2004 | Erekson et al. |
| 6,876,626 | B1 * | 4/2005 | Onoe et al. .................. 370/229 |
| 6,917,614 | B1 * | 7/2005 | Laubach et al. ............. 370/392 |
| 6,961,349 | B2 * | 11/2005 | Malomsoky et al. ........ 370/469 |
| 6,971,028 | B1 * | 11/2005 | Lyle et al. ..................... 726/25 |
| 6,999,437 | B2 * | 2/2006 | Krishnamurthi et al. .... 370/331 |
| 7,043,541 | B1 * | 5/2006 | Bechtolsheim et al. ...... 709/223 |
| 7,130,299 | B2 * | 10/2006 | Sukegawa et al. ........... 370/352 |
| 7,161,909 | B2 * | 1/2007 | Sharma ...................... 370/235 |
| 7,327,690 | B2 * | 2/2008 | Billhartz ..................... 370/245 |
| 7,366,172 | B2 * | 4/2008 | Chou et al. .................. 370/389 |
| 7,385,976 | B2 * | 6/2008 | Gu et al. ..................... 370/389 |
| 7,403,543 | B2 * | 7/2008 | Lee et al. ..................... 370/477 |
| 2003/0081609 | A1 * | 5/2003 | Breslow et al. ............. 370/394 |
| 2004/0143680 | A1 * | 7/2004 | Latvala ....................... 709/248 |
| 2004/0233878 | A1 * | 11/2004 | Liu et al. .................... 370/338 |
| 2005/0201342 | A1 * | 9/2005 | Wilkinson et al. .......... 370/338 |
| 2006/0230129 | A1 * | 10/2006 | Swami et al. ............... 709/223 |

* cited by examiner

*Primary Examiner*—Alpus H Hsu
*Assistant Examiner*—Jeremy Costin
(74) *Attorney, Agent, or Firm*—Wei Te Chung

(57) ABSTRACT

A method for numbering a plurality of frames with sequence numbers is implemented in a wireless network device having a plurality of data units, and includes the steps of: providing receiver addresses of the data units; and numbering each data unit with a respective sequence number according to the receiver address of the data unit. A WLAN device employing the method is also disclosed for avoiding denial of service (DoS) attacks and man-in-the-middle attacks.

15 Claims, 7 Drawing Sheets

WLAN DEVICE AND METHOD FOR NUMBERING FRAMES WITH SEQUENCE NUMBERS

FIELD OF THE INVENTION

The invention relates to wireless communication devices, and particularly to a wireless local area network (WLAN) device and method for numbering frames thereof with sequence numbers.

DESCRIPTION OF RELATED ART

The specification of the Institute of Electrical and Electronics Engineers (IEEE) known as 802.11 defines the structure of media access control (MAC) frames including data frames, management frames and control frames. FIG. 1 and FIG. 2 respectively show representations of an IEEE 802.11 MAC data frame 100 and an IEEE 802.11 MAC management frame 200. The data frame 100 and the management frame 200 include sequence control fields 160, 260, respectively. The sequence control fields 160, 260 include segment number subfields 161, 261 and sequence number subfields 162, 262, respectively. The sequence number subfields 162, 262 are fields indicating the sequence numbers of MAC service data units (MSDUs) or MAC management protocol data units (MMPDUs). Each MSDU or MMPDU is assigned a sequence number, ranging from 0 to 4095.

In a conventional method of communicating according to IEEE 802.11, a transmitting device assigns sequence numbers from a single modulo 4096 counter, starting from 0 and incrementing by 1 for each MSDU or MMPDU regardless of receiver addresses. When the transmitting device transmits management frames including MMPDUs to a receiving device, the receiving device cannot determine whether any one of the MMPDUs is fake according to the sequence numbers of the MMPDUs. Therefore, when network attackers transmit fake management frames including fake MMPDUs to the receiving device via a fake access point (AP), a man-in-the-middle (MITM) attack or a denial of service (DoS) attack is brought to the receiving device. The man-in-the-middle attack involves a client, a server, and a hacker in a communication session. The hacker operates between the client and the server on the network, and intercepts traffic that the client sends to the server and traffic that the server sends to the client.

SUMMARY OF INVENTION

An exemplary embodiment of the present invention provides a wireless local area network (WLAN) device for transmitting data units. The WLAN device includes a media access control (MAC) layer protocol module for numbering data units with sequence numbers. Each data unit includes a receiver address. The MAC layer protocol module includes a numbering module. The numbering module numbers each data unit with a respective sequence number according to the receiver address of the data unit.

Another exemplary embodiment of the present invention provides a method for numbering a plurality of frames with sequence numbers. The method is implemented in a wireless network device having a plurality of data units, and includes the steps of: providing receiver addresses of the data units; and numbering each data unit with a respective sequence number according to the receiver address of the data unit.

Other advantages and novel features will become more apparent from the following detailed description when taken in conjunction with the accompanying drawings, in which:

BREIF DESCRIPTION OF DRAWINGS

DETAILED DESCRIPTION

The Open Systems Interconnect Reference Model (OSI Reference Model or OSI Model for short) is a layered abstract description for communications and computer network protocol design, developed as part of the Open Systems Interconnect initiative. The OSI Reference Model is also called the OSI seven layer model. The first layer of the OSI model is a Physical layer, and the Physical layer defines all electrical and physical specifications for devices. The second layer of the OSI model is a Data link layer, and the Data link layer provides the functional and procedural means to transfer data between network entities and to detect and possibly correct errors that may occur in the Physical layer. The Data link layer is composed of two sublayers: a Media Access Control (MAC) layer and a Logical Link Control (LLC) layer. The third layer of the OSI model is a Network layer, and the Network layer provides the functional and procedural means of transferring variable length data sequences from a source to a destination via one or more networks while maintaining the quality of service requested by a Transport layer. The fourth layer of the OSI model is the Transport layer, and the purpose of the Transport layer is to provide transfer of data between end users, thus relieving the upper layers from any concern with providing reliable and cost-effective data transfer. The fifth layer of the OSI model is a Session layer, and the Session layer provides the mechanism for managing the dialogue between end-user application processes. The sixth layer of the OSI model is a Presentation layer, and the Presentation layer relieves the Application layer of concern regarding syntactical differences in data representation within the end-user systems. The seventh and highest layer of the OSI model is an Application layer, and the Application layer interfaces directly to and performs common application services for the application processes.

IEEE 802.11 defines the Physical layer and the MAC layer specifications, allowing wireless 802.11 WLAN devices to communicate with each other.

Figure 1:
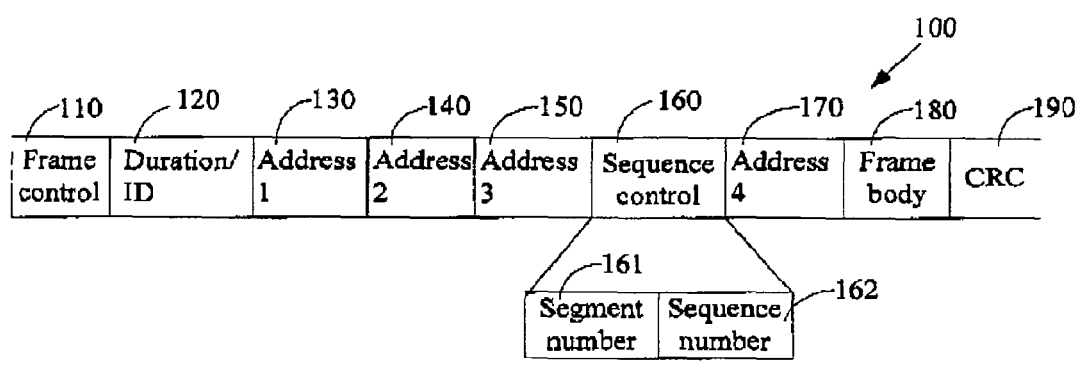
FIG. 1 is a schematic diagram of an IEEE 802.11 MAC data frame format.

FIG. 1 is a schematic diagram of an IEEE 802.11 MAC data frame format. The MAC data frame 100 includes a frame control field 110, a duration/ID field 120, an address 1 field 130, an address 2 field 140, an address 3 field 150, a sequence control field 160, an address 4 field 170, a frame body field 180, and a CRC (cyclic redundancy check) field 190. The sequence control field 160 includes a segment number subfield 161 and a sequence number subfield 162.

Figure 2:
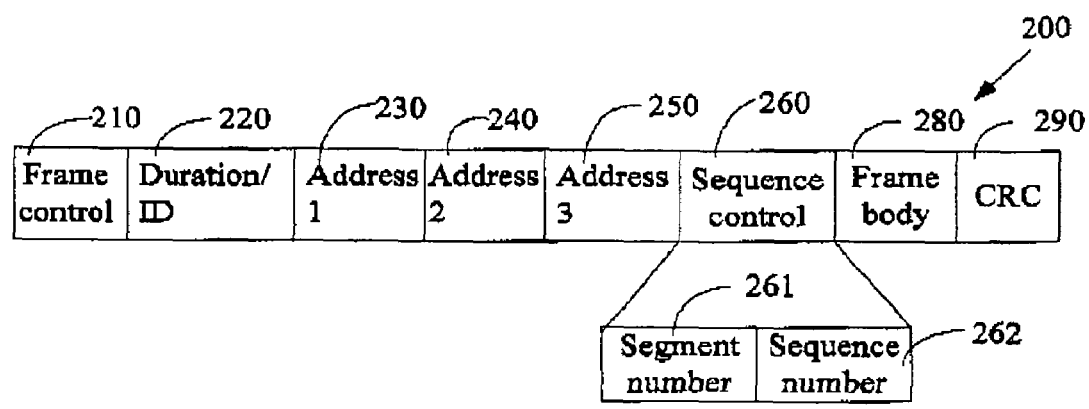
FIG. 2 is a schematic diagram of an IEEE 802.11 MAC management frame format.

FIG. 2 is a schematic diagram of an IEEE 802.11 MAC management frame format. The MAC management frame 200 includes a frame control field 210, a duration/ID field 220, an address 1 field 230, an address 2 field 240, an address 3 field 250, a sequence control field 260, a frame body field 280, and a CRC field 290. The sequence control field 260 includes a segment number subfield 261 and a sequence number subfield 262.

As shown in FIG. 1 and FIG. 2, the address 1 fields 130, 230 indicate receiver addresses of the frames 100, 200, namely the receiver addresses of MAC service data units (MSDUs) and MAC management protocol data units (MMPDUs). Each receiver address has 48 bits, different receiver addresses indicate different receivers, and the broadcast address is indicated by "FF: FF: FF: FF". The sequence control fields 160, 260 include the segment number subfields 161, 261, and the sequence number subfields 162, 262. The sequence number subfields 162, 262 include sequence numbers of MSDUs or MMPDUs of the frames 100, 200. The frame body fields 181, 281 include the MSDUs from a higher layer and the MMPDUs generated in an MAC layer. Each MSDU or MMPDU is assigned a sequence number, ranging from 0 to 4095.

Figure 3:
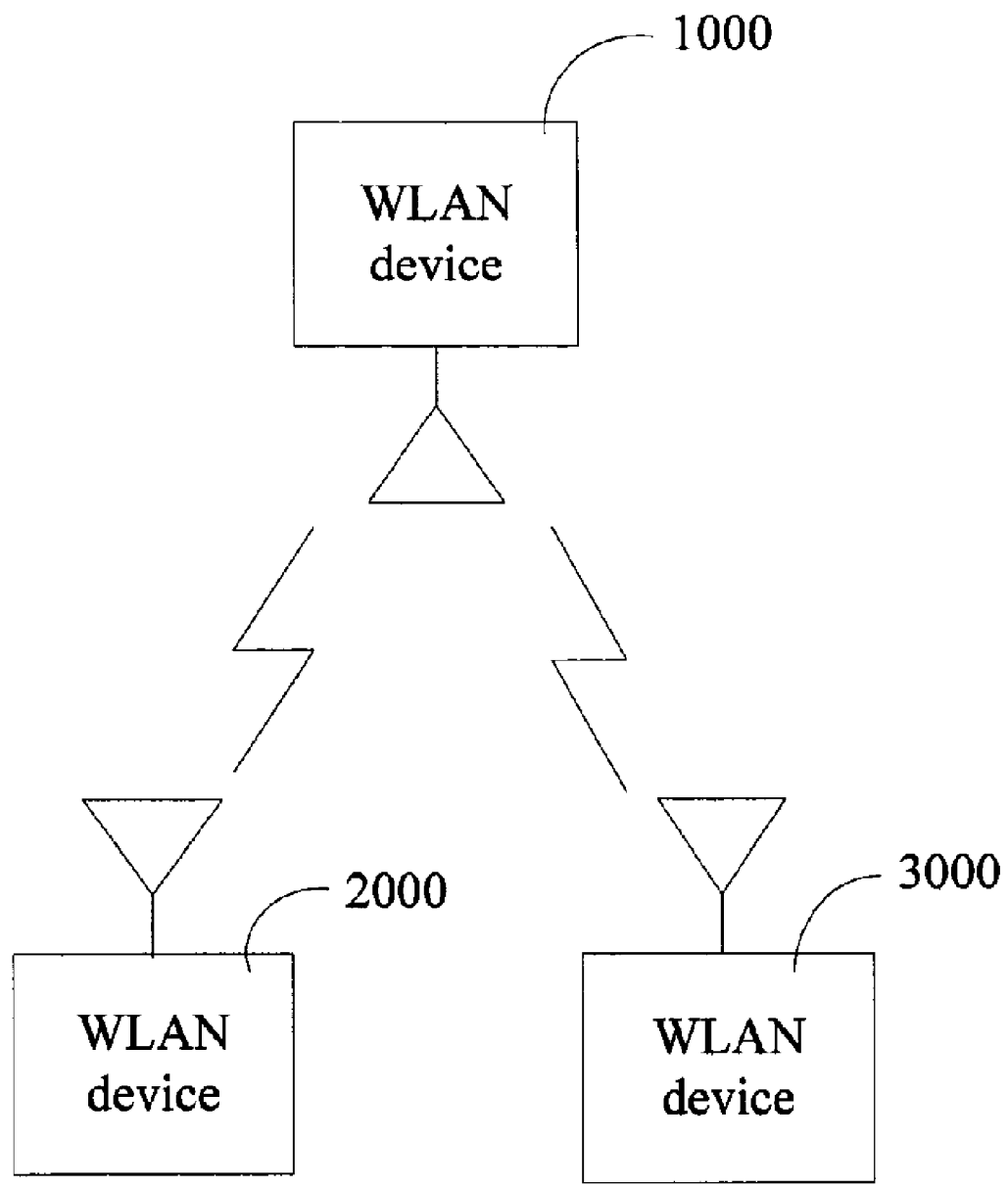
FIG. 3 is a schematic diagram of an exemplary application environment of any of various exemplary embodiments of the present invention, including a WLAN device according to any of various exemplary embodiments of the present invention.

FIG. 3 is a schematic diagram of an exemplary application environment of any of various exemplary embodiments of the present invention, including a WLAN device according to any of various exemplary embodiments of the present invention. In the exemplary application environment, a wireless communication system includes a plurality of WLAN devices 1000, 2000, 3000. The WLAN device 1000 transmits data to a plurality of WLAN devices 2000, 3000, and transmits broadcast data.

Figure 4:
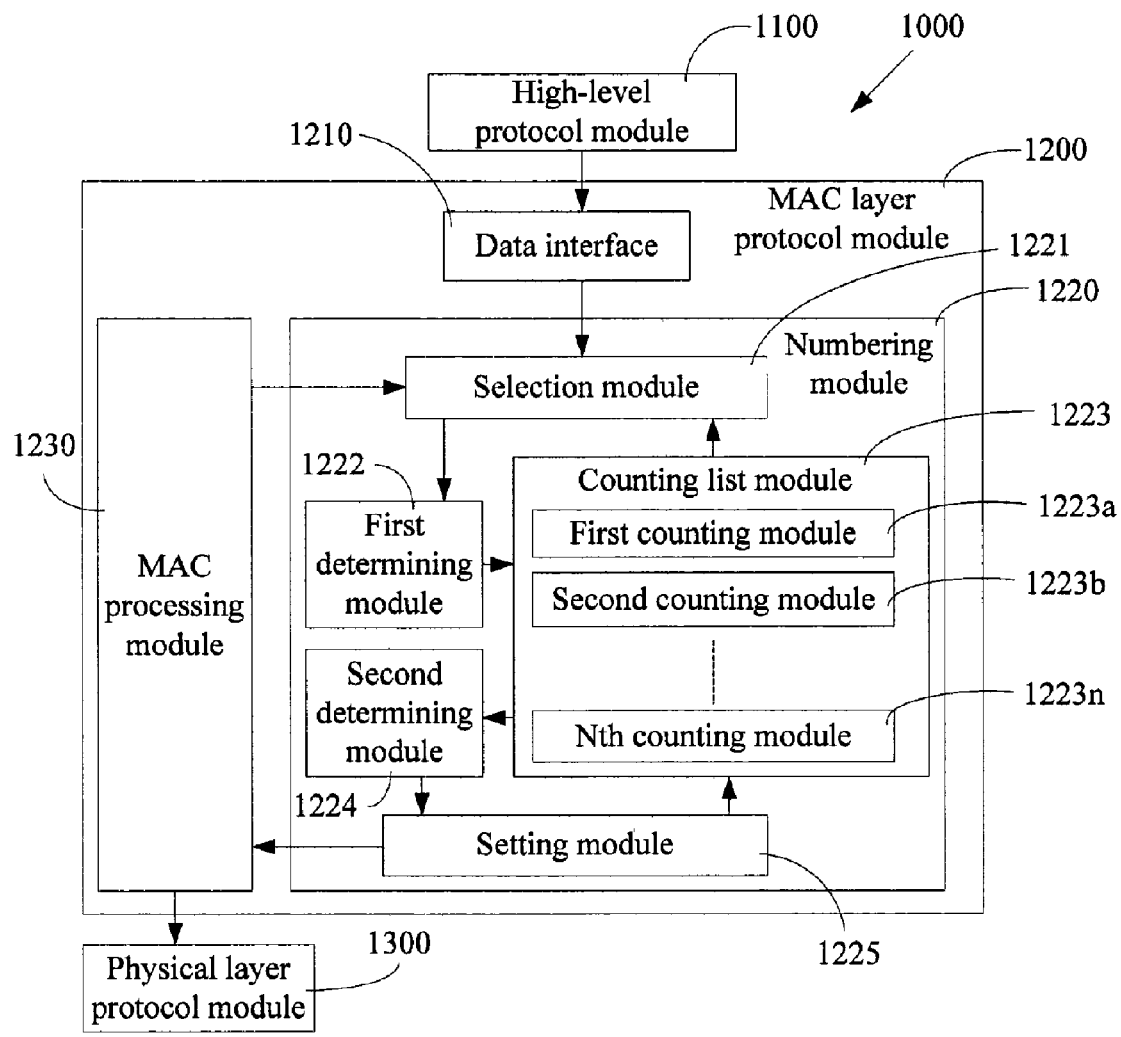
FIG. 4 is a block diagram of functional modules of a WLAN device of an exemplary embodiment of the present invention.

FIG. 4 is a block diagram of functional modules of the WLAN device 1000 of an exemplary embodiment of the present invention. In the exemplary embodiment, the WLAN device 1000 includes a high-level protocol module 1100, an MAC layer protocol module 1200, and a physical layer protocol module 1300. The high-level protocol module 1100 is used for providing a plurality of data units. In the exemplary embodiment, the high-level protocol module 1100 implements functions of the Application layer, the Presentation layer, the Session layer, the Transport layer, the Network layer and the LLC layer, converts the transmitted data into MSDUs, and then transmits the MSDUs and receiver addresses thereof to the MAC layer protocol module 1200. The MAC layer protocol module 1200 is used for generating a plurality of data units, and for numbering the data units provided by the high-level protocol module 1100 and the data units generated by the MAC layer protocol module 1200 with sequence numbers. The MAC layer protocol module 1200 is also used for applying the sequence numbers to the data units, and for adding related information fields to the data units to form MAC protocol data units (MPDUs). The physical layer protocol module 1300 is used for generating physical protocol data units (PPDUs) by adding other information fields to the MPDUs.

In the exemplary embodiment, the MAC layer protocol module 1200 includes a data interface 1210, a numbering module 1220, and an MAC processing module 1230. The data interface 1210 is used for receiving the MSDUs and the receiver addresses thereof from the high-level protocol level 1100, and for transmitting the MSDUs and the receiver addresses thereof to the numbering module 1220. In an alternative exemplary embodiment, the MAC layer protocol module 1200 does not include the data interface 1210. The MAC processing module 1230 is used for generating a plurality of data units. In the exemplary embodiment, the MAC processing module 1230 generates MMPDUs and receiver addresses thereof according to requirements of management, and transmits the MMPDUs and the receiver addresses thereof to the numbering module 1220.

The numbering module 1220 is used for numbering each data unit with a respective sequence number according to the receiver address of the data unit. In the exemplary embodiment, the numbering module 1220 receives the MSDUs and the receiver addresses thereof from the data interface 1210, and the MMPDUs and the receiver addresses thereof from the MAC processing module 1230, and then numbers the MSDUs and the MMPDUs in sequence according to the receiver addresses thereof.

The numbering module 1220 includes a selection module 1221, a first determining module 1222, a counting list module 1223, a second determining module 1224, and a setting module 1225. The counting list module 1223 includes a plurality of counting modules; i.e., a first counting module 1223a, a second counting module 1223b, and so on through to an Nth counting module 1223n. The first through Nth counting modules 1223a-1223n are for numbering each data unit with a sequence number. The selection module 1221 is used for selecting two counting modules from the counting list module 1223 for each data unit according to the receiver address of the data unit. In the exemplary embodiment, the selection module 1221 receives the MSDUs and the receiver addresses thereof from the data interface 1210, and the MMPDUs and the receiver addresses thereof from the MAC processing module 1230, and then selects two counting modules from the counting list module 1223 for each data unit according to the receiver address of the data unit. The two counting modules are respectively used for numbering an MSDU and an MMPDU with sequence numbers. In the exemplary embodiment, the selection module 1221 selects the first counting module 1223a for numbering the MMPDU with a sequence number, and the second counting module 1223b for numbering the MSDU with a sequence number. The first determining module 1222 determines whether the data unit is an MMPDU. The second determining module 1224 determines whether the sequence number numbered by the counting modules is less than a predetermined threshold value. In the exemplary embodiment, the predetermined threshold value is 4096.

The setting module 1225 is used for setting a sequence number to the data unit according to the results of the determination of the first determining module 1222 and the second determining module 1224. In the exemplary embodiment, if the data unit is an MMPDU and the sequence number numbered by the first counting module 1223a is less than the predetermined threshold value, the sequence number numbered by the first counting module 1223a is set to the data unit received by the setting module 1225. If the data unit is an MSDU and the sequence number numbered by the second counting module 1223b is less than the predetermined threshold value, the sequence number numbered by the second counting module 1223b is set to the data unit received by the setting module 1225. If the sequence number numbered by the first counting module 1223a or the second counting module 1223b is not less than the predetermined threshold value, a predetermined or default sequence number is set to the data unit received by the setting module 1225. In the exemplary embodiment, the predetermined sequence number is 0. The setting module 1225 is also used for updating the counting list module 1223.

The MAC processing module 1230 is also used for applying the sequence numbers numbered by the numbering module 1220 to the data units, and for adding information fields to the data units to form MPDUs. In the exemplary embodiment, the MAC processing module 1230 adds information fields to the MSDUs and the MMPDUs to form MPDUs, and applies the sequence numbers numbered by the numbering module 1220 to the sequence number subfields 162, 262 of the MPDUs (see FIG. 1 and FIG. 2).

The physical layer protocol module 1300 generates PPDUs by adding other information fields to the MPDUs formed by the MAC layer protocol module 1200, and then transmits the PPDUs to the WLAN devices 2000, 3000 or broadcasts the PPDUs.

Figure 5:
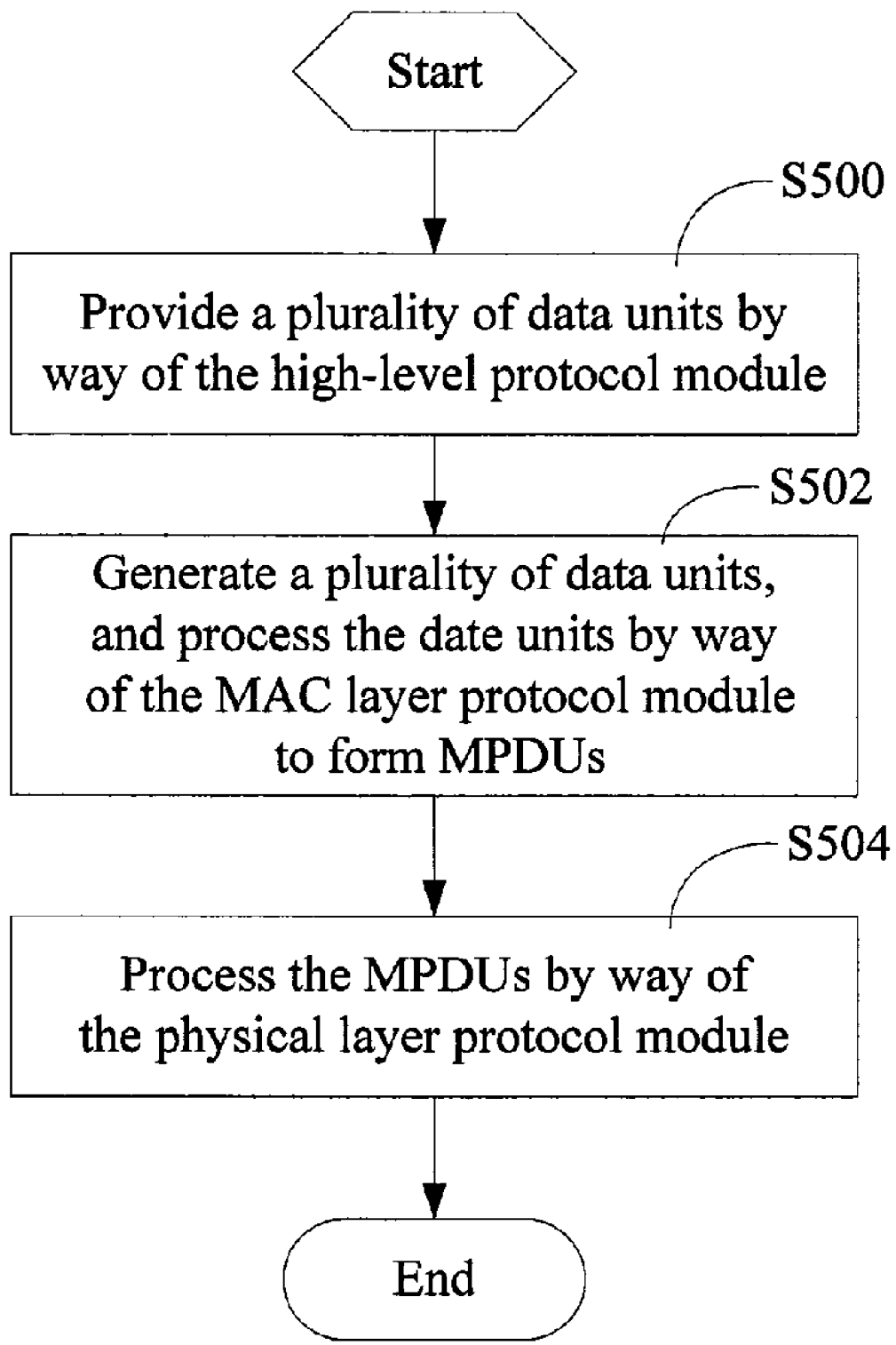
FIG. 5 is a flowchart of data processing in accordance with another exemplary embodiment of the present invention.

FIG. 5 is a flowchart of data processing implemented according to an exemplary embodiment of the WLAN device 1000. In the exemplary embodiment, when the WLAN device 1000 transmits data to a plurality of WLAN devices 2000, 3000 or transmits broadcast data, the transmitted data must be processed by a plurality of protocol layers of an OSI Model before transmitting.

In step S500, the high-level protocol module 1100 provides a plurality of data units. In the exemplary embodiment, the high-level protocol module 1100 implements functions of the Application layer, the Presentation layer, the Session layer, the Transport layer, the Network layer and the LLC layer, converts the transmitted data into MSDUs, and then transmits the MSDUs and receiver addresses thereof to the MAC layer protocol module 1200.

In step S502, the MAC layer protocol module 1200 generates a plurality of data units, and processes the data units provided by the high-level protocol module 1100 and the data units generated by the MAC layer protocol module 1200. In the exemplary embodiment, the MAC layer protocol module 1200 numbers the data units provided by the high-level protocol module 1100 and the data units generated by the MAC layer protocol module 1200 with sequence numbers, applies the sequence numbers to the data units, and adds related information fields to the data units to form MPDUs. Details of a method for numbering the data units by the MAC layer protocol module 1200 are described below in relation to FIG. 6.

In step S504, the physical layer protocol module 1300 processes the MPDUs. In the exemplary embodiment, the physical layer protocol module 1300 generates physical layer protocol data units (PPDUs) by adding other related information fields to the MPDUs.

Figure 6:
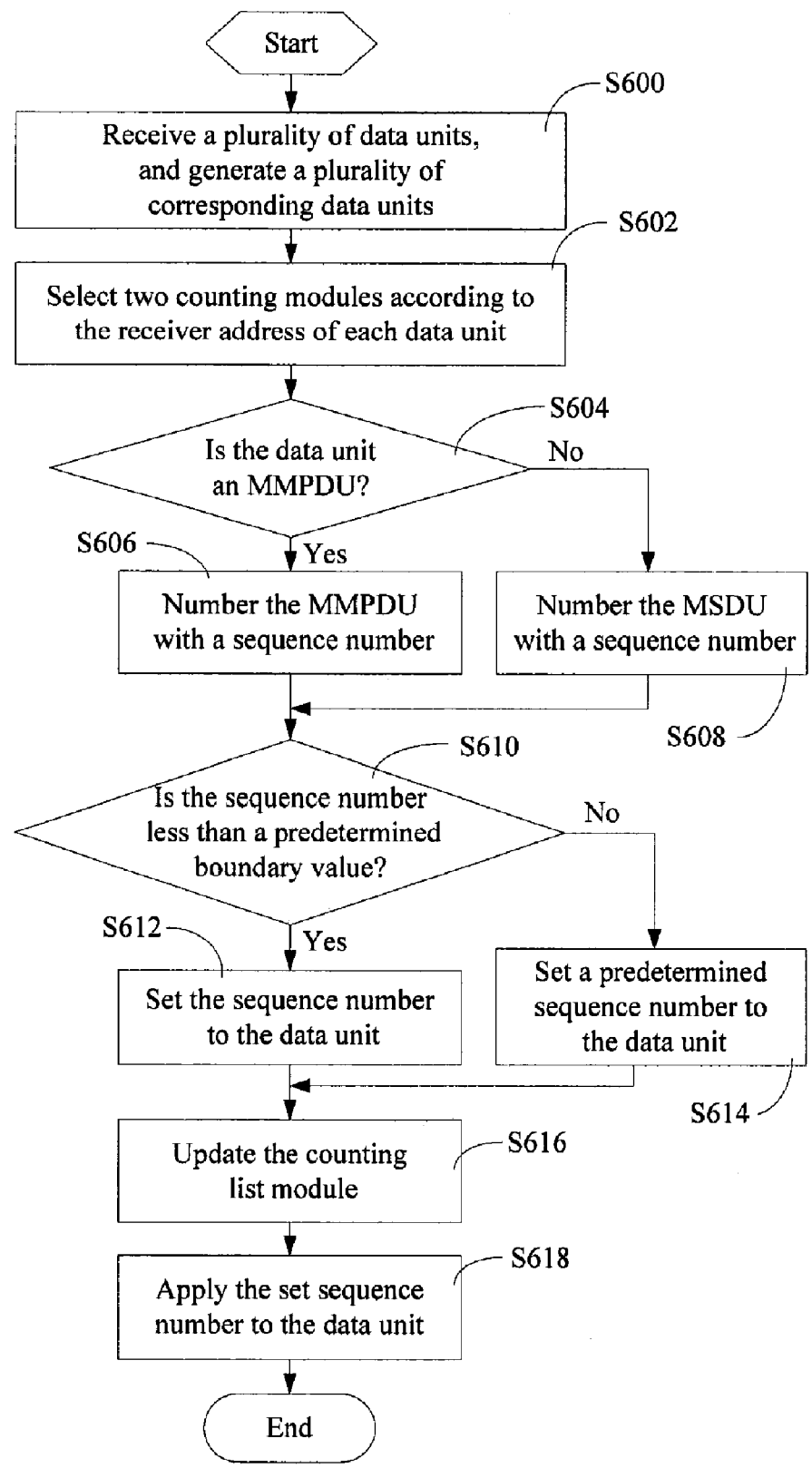
FIG. 6 is a flowchart of a method for numbering frames with sequence numbers in accordance with still another exemplary embodiment of the present invention.

FIG. 6 is a flowchart of a method for numbering frames with sequence numbers according to an exemplary embodiment of the present invention. In the exemplary embodiment, when the WLAN device 1000 transmits data units to a plurality of WLAN devices 2000, 3000 or transmits broadcast data units, each transmitted data unit must be numbered with a sequence number.

In step S600, the data interface 1210 receives a plurality of data units, and the MAC processing module 1230 generates a plurality of corresponding data units. In the exemplary embodiment, the data interface 1210 receives MSDUs and receiver addresses thereof from the high-level protocol module 1100, and then transmits the MSDUs and the receiver addresses thereof to the selection module 1221 of the numbering module 1220. The MAC processing module 1230 generates MMPDUs and receiver addresses thereof according to requirements of management, and then transmits the MMPDUs and the receiver addresses thereof to the selection module 1221 of the numbering module 1220.

In step S602, the selection module 1221 receives the data units and the receiver addresses thereof, and selects two counting modules for each data unit according to the receiver address of the data unit. In the exemplary embodiment, the selection module 1221 receives the MSDUs and the receiver addresses thereof from the data interface 1210, and the MMPDUs and the receiver addresses thereof from the MAC processing module 1230, and then selects two counting modules for each data unit from the counting list module 1223 according to the receiver address of the data unit. The two counting modules can respectively number the data unit with a sequence number, according to whether the data unit is an MSDU or an MMPDU. In the exemplary embodiment, the receiver address of the data unit indicates that the data unit is transmitted to the WLAN device 2000, and the selection module 1221 selects the first counting module 1223*a* for numbering the MMPDU transmitted to the WLAN device 2000 with a sequence number, and the second counting module 1223*b* for numbering the MSDU transmitted to the WLAN device 2000 with a sequence number.

In another exemplary embodiment, the receiver address of the data unit may indicate that the data unit is transmitted to another WLAN device (such as the WLAN device 3000), or is broadcast data, and the selection module 1221 may select other counting modules from the counting list module 1223.

In step S604, the first determining module 1222 determines whether the data unit is an MMPDU.

If the data unit is an MMPDU, then in step S606, the first counting module 1223*a* numbers the MMPDU with a sequence number according to a first function. In the exemplary embodiment, the first function is $F(x)=4x+1$, wherein x is defined as the sequence of the MMPDU transmitted to the WLAN device 2000. Therefore the sequence number of the first MMPDU transmitted to the WLAN device 2000 is 5, the sequence number of the second MMPDU transmitted to the WLAN device 2000 is 9, and so on. In another exemplary embodiment, the first function may be another kind of linear function or another type of function.

If the data unit is not an MMPDU, the data unit is an MSDU. In such case, in step S608, the second counting module 1223*b* numbers the MSDU with a sequence number according to a second function. In the exemplary embodiment, the second function is $F(x)=x+1$, wherein x is defined as the sequence of the MSDU transmitted to the WLAN device 2000. Therefore the sequence number of the first MSDU transmitted to the WLAN device 2000 is 2, the sequence number of the second MSDU transmitted to the WLAN device 2000 is 3, and so on. In the exemplary embodiment, the second function is different from the first function.

In other exemplary embodiments, the second function may be another linear function or another type of function, or/and the second function may be the same as the first function.

In step S610, the second determining module 1224 determines whether the sequence number numbered by the first counting module 1223*a* or the second counting module 1223*b* is less than a predetermined threshold value. In the exemplary embodiment, the predetermined threshold value is 4096.

If the numbered sequence number is less than the predetermined threshold value, in step S612, the setting module 1225 sets the numbered sequence number to the data unit. In the exemplary embodiment, if the data unit is an MMPDU, the sequence number numbered by the first counting module 1223*a* is set to the data unit; and if the data unit is an MSDU, the sequence number numbered by the second counting module 1223*b* is set to the data unit.

If the numbered sequence number is not less than the predetermined threshold value, in step S614, the setting module 1225 sets a predetermined sequence number to the data unit. In the exemplary embodiment, the predetermined sequence number is 0.

In step S616, the setting module 150 updates the counting modules of the counting list module 1223 according to the setting result of step S612 or step S614. The setting module 150 then transmits the data unit, the receiver address, and the set sequence number thereof to the MAC processing module 1230. In the exemplary embodiment, the setting module 1225 updates the first counting module 1223a or the second counting module 1223b.

In step S618, the MAC processing module 1230 applies the sequence number to the data unit. In the exemplary embodiment, the MAC processing module 1230 receives the data unit, the receiver address, and the set sequence number thereof, adds related information fields to the data unit to form an MPDU, applies the set sequence number to the sequence number subfield of the MPDU, and then transmits the MPDU to the physical layer protocol module 1300.

Figure 7:
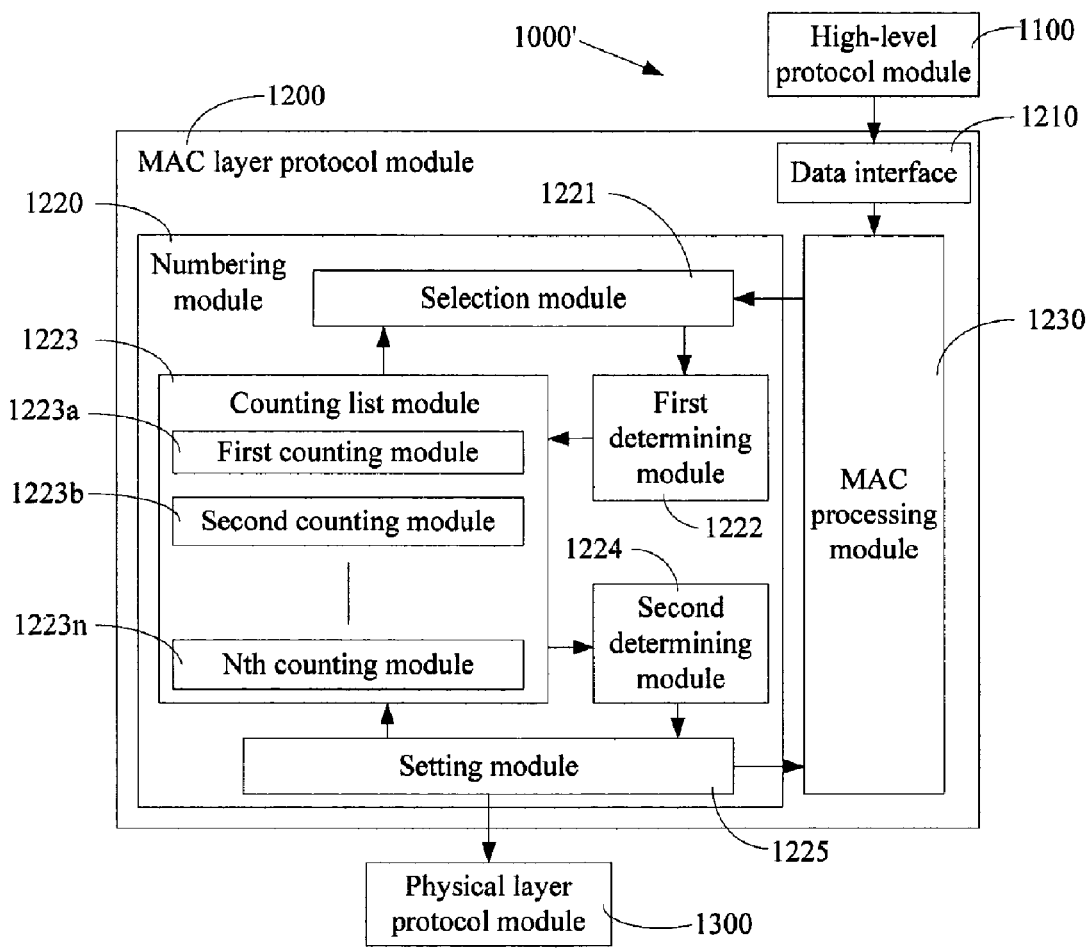
FIG. 7 is a block diagram of functional modules of a WLAN device of yet another exemplary embodiment of the present invention.

FIG. 7 is a block diagram of functional modules of a WLAN device 1000' of another exemplary embodiment of the present invention. Functional components of the WLAN device 1000' are the similar to those described above in relation to the WLAN device 1000. However, in the WLAN device 1000', the MAC processing module 1230 receives MSDUs and receiver addresses thereof from the high-level protocol module 1100 via the data interface 1210, generates MMPDUs and receiver addresses according to requirements of management, adds related information fields to the MSDUs and MMPDUs to form MPDUs, and transmits the MPDUs to the numbering module 1220. In the exemplary embodiment, the added information fields include the sequence number subfield, and the numbering module 1220 updates the sequence number subfield of each MPDU. In another exemplary embodiment, the added information fields do not include the sequence number subfield, and the numbering module 1220 numbers each MPDU with a sequence number. In either case, the numbering module 1220 then transmits the numbered MPDUs to the physical protocol module 1300.

The WLAN device of any of the above-described embodiments numbers each data unit with a respective sequence number according to the receiver address of the data unit, applies the sequence numbers to MPDUs formed by the data units, and transmits the MPDUs to a receiving device. The receiving device can check the sequence number subfields of the MPDUs to filter fake MPDUs including fake management frames in order to avoid man-in-the-middle (MITM) attacks or denial of service (DoS) attacks.

In other alternative embodiments, Extensive Authentication Protocol (EAP) frames can be employed in the above-described embodiments.

While various embodiments including methods of the present invention have been described above, it should be understood that they have been presented by way of example only and not by way of limitation. Thus the breadth and scope of the present invention should not be limited by the above-described exemplary embodiments, but should be defined only in accordance with the following claims and their equivalents.

What is claimed is:

1. A wireless local area network (WLAN) device for transmitting data units, comprising:
a media access control (MAC) layer protocol module for numbering data units with sequence numbers, wherein the data units comprise MAC management protocol data units (MMPDUs) and MAC service data units (MSDUs), each data unit comprises a receiver address, and the MAC layer protocol module comprises:
a numbering module for numbering each data unit with a respective sequence number according to the receiver address of the data unit, the numbering module comprising:
a counting list module comprising a plurality of counting modules for numbering each data unit with a sequence number; and
a selection module for selecting a first counting module for numbering the data unit with a sequence number according to the receiver address of the data unit if the data unit is an MMPDU, and a second counting module for numbering the data unit with a sequence number according to the receiver address of the data unit if the data unit is an MSDU; wherein the first counting module numbers the MMPDU with a sequence number according to a first mathematical function, the second counting module numbers the MSDU with a sequence number according to a second mathematical, and the first mathematical function is different from the second mathematical function.

2. The WLAN device as claimed in claim 1, wherein the numbering module further comprises a first determining module for determining whether the data unit is an MMPDU.

3. The WLAN device as claimed in claim 2, wherein the numbering module further comprises a second determining module for determining whether the sequence number numbered by the applicable counting module is less than a predetermined threshold value.

4. The WLAN device as claimed in claim 3, wherein the numbering module further comprises a setting module for setting a sequence number to the data unit according to the results of the determinations of the first determining module and the second determining module.

5. The WLAN device as claimed in claim 1, wherein the MAC layer protocol module further comprises an MAC processing module for generating a plurality of data units, applying sequence numbers to the data units, and adding related information fields to the data units to form MAC protocol data units (MPDUs).

6. The WLAN device as claimed in claim 5, further comprising a physical layer protocol module for generating physical protocol data units (PPDUs) by encapsulating the MPDUs into the PPDUs.

7. The WLAN device as claimed in claim 6, further comprising a high-level protocol module for providing a plurality of data units to the MAC layer protocol module.

8. The WLAN device as claimed in claim 7, further comprising a data interface for receiving the data units from the high-level protocol module, and transmitting the data units to the numbering module.

9. The WLAN device as claimed in claim 7, further comprising a data interface for receiving the data units from the high-level protocol module, and transmitting the data units to the MAC processing module.

10. A method for numbering a plurality of frames with sequence numbers, implemented in a wireless network device having a plurality of data units, the method comprising the steps of:
providing receiver addresses of the data units, wherein the data units comprise media access control service data units (MSDUs) and media access control management protocol data units (MMPDUs); and
numbering each data unit with a respective sequence number according to the receiver address of the data unit, the numbering step comprising:

selecting a first counting module for numbering the data unit with a sequence number according to the receiver address of the data unit if the data unit is an MMPDU, and a second counting module for numbering the data unit with a sequence number according to the receiver address of the data unit if the data unit is an MSDU; wherein the first counting module numbers the MMPDU with a sequence number according to a first mathematical function, the second counting module numbers the MSDU with a sequence number according to a second mathematical, and the first mathematical function is different from the second mathematical function.

11. The method as claimed in claim 10, wherein the numbering step further comprises:
   determining whether the data unit is an MMPDU;
   numbering the MMPDU with a sequence number by the first counting module, if the data unit is an MMPDU;
   determining whether the sequence number numbered by the first counting module is less than a predetermined threshold value; and
   setting the sequence number numbered by the first counting module to the MMPDU, if the sequence number is less than the predetermined threshold value.

12. The method as claimed in claim 11, further comprising the step of setting a predetermined sequence number to the MMPDU, if the sequence number numbered by the first counting module is not less than the predetermined threshold value.

13. The method as claimed in claim 11, further comprising the steps of:
   numbering the data unit with a sequence number by the second counting module, if the data unit is not an MMPDU but an MSDU;
   determining whether the sequence number numbered by the second counting module is less than the predetermined threshold value; and
   setting the sequence number numbered by the second counting module to the MSDU, if the sequence number is less than the predetermined threshold value.

14. The method as claimed in claim 13, further comprising the step of setting a predetermined sequence number to the MSDU, if the sequence number numbered by the second counting module is not less than the predetermined threshold value.

15. The method as claimed in claim 13, further comprising the step of applying the set sequence number of each data unit to the data unit.

* * * * *

UNITED STATES PATENT AND TRADEMARK OFFICE
CERTIFICATE OF CORRECTION

PATENT NO. : 7,636,342 B2
APPLICATION NO. : 11/308051
DATED : December 22, 2009
INVENTOR(S) : Cheng-Wen Tang Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 681 days.

Signed and Sealed this

Ninth Day of November, 2010

David J. Kappos
*Director of the United States Patent and Trademark Office*